(12) United States Patent
Dianov et al.

(10) Patent No.: US 9,052,433 B2
(45) Date of Patent: Jun. 9, 2015

(54) MULTICORE OPTICAL FIBER (VARIANTS)

(75) Inventors: Evgeny Mikhailovich Dianov, Moscow (RU); Sergei Lvovich Semenov, Moscow (RU); Olga Nikolaevna Egorova, Moscow (RU)

(73) Assignee: Fiber Optics Research Center of the Russian Academy of Sciences (FORC RAS), Moscow (RU)

( * ) Notice: Subject to any disclaimer, the term of this patent is extended or adjusted under 35 U.S.C. 154(b) by 96 days.

(21) Appl. No.: 13/980,536

(22) PCT Filed: Dec. 23, 2011

(86) PCT No.: PCT/RU2011/001022
§ 371 (c)(1),
(2), (4) Date: Jul. 18, 2013

(87) PCT Pub. No.: WO2012/099498
PCT Pub. Date: Jul. 26, 2012

(65) Prior Publication Data
US 2013/0294737 A1    Nov. 7, 2013

(30) Foreign Application Priority Data

Jan. 19, 2011   (RU) .............................. 2011101861

(51) Int. Cl.
*G02B 6/02* (2006.01)
*G02B 6/036* (2006.01)

(52) U.S. Cl.
CPC ............ *G02B 6/02042* (2013.01); *G02B 6/036* (2013.01); *G02B 6/02395* (2013.01)

(58) Field of Classification Search
CPC .................................................. G02B 6/02042
See application file for complete search history.

(56) References Cited

U.S. PATENT DOCUMENTS

| 6,628,874 B1 | 9/2003 | Sugawara |
| 7,509,010 B2 | 3/2009 | Hiraga et al. |
| 2013/0016949 A1* | 1/2013 | Yao et al. ...................... 385/126 |
| 2013/0183016 A1* | 7/2013 | Imamura ........................ 385/127 |

FOREIGN PATENT DOCUMENTS

| EP | 1918743 A1 | 5/2008 |
| EP | 2083291 A2 | 7/2009 |

OTHER PUBLICATIONS

International Search Report issued by the ISA/FIPS, Moscow, Russia, dated May, 25, 2012, for related International Application No. PCT/RU2011/001022; 2 pages.

* cited by examiner

*Primary Examiner* — Hemang Sanghavi
(74) *Attorney, Agent, or Firm* — Faegre Baker Daniels LLP

(57) ABSTRACT

The invention relates to optical fiber communications. A multicore optical fiber comprises at least two light-guiding cores made of doped fused silica with refractive indices $n_{c1}$, $n_{c2}$, $n_{ck}$, each light-guiding core of the at least two light-guiding cores being surrounded by a respective arbitrarily shaped inner reflecting cladding made of fused silica or doped fused silica with refractive indices $nc_{11}$, $nc_{12}$, $n_{clk}$, which are less than the refractive indices $n_{c1}$, $n_{c2}$, $n_{ck}$ of respective light-guiding cores; a continuous or intermittent barrier region made of fused silica and having an arbitrary cross-sectional shape, the barrier region being formed in the space between the inner reflecting claddings and an outer cladding of fused silica with refractive index $n_0$, the barrier region having refractive index $n_b$, which is less than the refractive index of each of the inner reflecting claddings; and an external protective coating. In another embodiment the barrier region can be formed of through holes in fused silica or doped fused silica.

63 Claims, 4 Drawing Sheets

MULTICORE OPTICAL FIBER (VARIANTS)

FIELD OF THE INVENTION

The present invention relates to fiber optics, and more particularly to optical fibers with multiple cores for fiber-optic communication lines.

The invention is applicable in optical communications systems as a transmitting fiber utilized to deliver signal in intracity communication lines when the number or general section of the laid fiber-optic cables is limited.

BACKGROUND OF THE INVENTION

For signal transmission in optical communication lines, standard single-mode optical fibers having a single light-guiding core are used. Modern telecommunications optical fibers are capable of long-range transmission of huge amounts of data. However, constantly emerging new applications (e.g. HDTV) dramatically (almost exponentially) increase the requirements to the amount of data to be transmitted. To maintain a high data transfer rate all the way to the end user and reduce power consumption, it is necessary to minimize converting the optical signals to electrical signals and back on the path to the end user. This means that each end user should be ideally supplied with a signal propagating over an individual optical fiber. However underground pipes containing optical fibers, especially in large cities, can hold only a limited number of fibers (diameter of pipes between wells), which prevents increasing the number of optical fibers laid in them.

To increase the number of end users supplied with individual channels without renovation/reconstruction of all underground utilities it has been suggested to use several light-guiding cores in a single optical fiber. One such fiber replaces the number of standard optical fibers corresponding to the number of cores.

The main problem in designing multicore fibers is the optical cross-talk, i.e. the interference of the signals carried in one core with the signals carried in other cores.

A conventional fiber comprises seven 8-μm-diameter cores arranged in a hexagonal array. To reduce cross-talk, it is necessary to decrease the interaction between modes of neighboring cores, to this end the cores are arranged far enough (at a distance over 38 microns) from each other (B. Zhu, et al, Seven-core multicore fiber transmissions for passive optical network, Optics Express, Vol. 18, No. 11, pp. 11117-111122 (2010)). The disadvantage of this approach is the big distance between the cores, which allows placing no more than seven cores inside an optical fiber with the standard diameter of 125 microns.

In another conventional fiber structure (M. Koshiba et al, Heterogeneous multicore fibers: proposal and design principle, IEICE Electronics Express, Vol. 6, No. 2, pp. 98-103, 2009), modes of different fiber cores have different propagation constants in order to reduce crosstalk. For this purpose, the cores are made with different diameters. This enables the distance between the centers of cores to be reduced compared to the optical fiber with identical cores, while maintaining an acceptable level of crosstalk. With the core diameter of about 9 microns the distance between the cores is 35 microns, and with the core diameter of about 5 microns it is 20 microns. The disadvantage of this method is the difficulty of joining the fibers to other fibers, because when joining the fiber to another optical fiber it is necessary not just to join the cores with each other, but also to find cores of each particular type and to align exactly them.

Moreover, it was found that bends of multicore optical fibers, even with relatively large bending radii (40-100 mm), dramatically increase crosstalk, even if the cores have different propagation parameters (T. Hayashi et al, Crosstalk variation of multicore fibre due to fibre bend, Proc. ECOC2010, 19-23 September, 2010, Torino, Italy, paper We.8.F.6.). Thus, the above structures of multicore fibers apparently either cannot be used in real communication lines, or will require special sophistication and cost increase of the structure of fiber-optic cables, needed to restrict the possible bending of the fiber in the laid cable.

The present invention is aimed at eliminating the above disadvantages of the prior art. The object of the present invention is to provide a multicore fiber comprising a plurality of light-guiding cores having the same or different parameters (diameters or refractive indices) and a barrier layer, whose refractive index must be less than the refractive index of each of the inner reflecting claddings surrounding the respective light-guiding core; so the interaction between modes of adjacent light-guiding cores can be reduced, thereby significantly reducing the optical crosstalk and enabling the reduction in distance between the cores. Reducing the distance between the cores will allow increasing the number of cores in a multicore fiber with the same external diameter of the fiber; therefore the existing underground utilities can be utilized to transmit greater amounts of data.

Furthermore, the presence of the barrier layer will reduce the bending optical loss in each of the cores and thus improve the quality of information transmission.

SUMMARY OF THE INVENTION

According to a first aspect of the invention there is provided a multicore optical fiber comprising at least two light-guiding arbitrarily shaped cores made of doped fused silica with refractive indices $n_{c1}$, $n_{c2}$, $n_{ck}$, each light-guiding core of the at least two light-guiding cores being surrounded by a respective arbitrarily shaped inner reflecting cladding made of fused silica or doped fused silica with refractive indices $n_{cl1}$, $n_{cl2}$, $n_{clk}$, which are less than the refractive indices $n_{c1}$, $n_{c2}$, $n_{ck}$ of respective light-guiding cores; a continuous barrier region made of doped fused silica and having an arbitrary cross-sectional shape, the barrier region being formed in the space between the inner reflecting claddings and an outer cladding made of fused silica with refractive index $n_0$, the barrier region having refractive index $n_b$, which is less than the refractive index of each of the inner reflecting claddings, and an external protective coating.

In the fiber, said inner reflecting claddings are made of fused silica or doped fused silica, and in case of the inner reflecting claddings made of fused silica refractive indices $n_{cl1}$, $n_{cl2}$, $n_{clk}$ of said reflective inner claddings are equal to $n_0$, and in case of the inner reflecting claddings made of doped fused silica refractive index $n_{cl1}$, $n_{cl2}$, $n_{clk}$ of each of said inner reflecting claddings is greater than, equal to or less than the fused silica refractive index $n_0$.

In addition, the inner reflecting claddings have a cross-sectional shape selected from circle, hexagon, square, square with rounded corners, and hexagon with rounded corners.

According to the first aspect of the invention difference $\Delta n_{cl1\ldots k}$ in the refractive index of each of said inner reflecting claddings relative to the outer cladding refractive index $n_0$ is $\Delta n_{cl1\ldots k} = n_{cl1\ldots k} - n_0$, and difference $\Delta n_{c1\ldots k}$ in the refractive index of each of said light-guiding cores relative to the outer cladding refractive index $n_0$ of the multicore fiber is $\Delta n_{c1\ldots k} = n_{c1\ldots k} - n_0$.

The barrier region can be made of doped fused silica containing at least one dopant selected from the group consisting of boron oxide, fluorine, or a combination thereof.

Furthermore, difference $\Delta n_{c1 \ldots k}$ in the refractive index of each light-guiding core relative to the refractive index of the outer cladding is in the range from 0.002 to about 0.015; and difference $\Delta n_{cl1 \ldots k}$ in the refractive index of each inner reflecting cladding relative to the refractive index of the outer cladding is from −0.001 to 0.002.

According to the invention, difference $\Delta n_b$ in the refractive index of the barrier region relative to the refractive index of the outer cladding is $\Delta n_b = n_b - n_0$ and has a negative value; difference $\Delta n_b$ in the refractive index of the barrier region relative to the refractive index of the outer cladding is less than −0.002 if the barrier region is made of doped fused silica.

According to a second aspect of the invention there is provided a multicore optical fiber comprising at least two light-guiding cores made of doped fused silica with refractive indices of $n_{c1}$, $n_{c2}$, $n_{ck}$, each light-guiding core of said at least two light-guiding cores being surrounded by a respective arbitrarily shaped inner reflecting cladding made of fused silica or doped fused silica with refractive indices $n_{cl1}$, $n_{cl2}$, $n_{clk}$, which are less than the refractive index $n_{c1}$, $n_{c2}$, $n_{ck}$ of the light-guiding cores; an intermittent barrier region formed in the space between the inner reflecting claddings and an outer cladding of fused silica with refractive index $n_0$, the barrier region consisting of arbitrarily arranged individual elements of doped fused silica with refractive indices $n_{b1}$, $n_{b2}$, $n_{bm}$, each of the refractive indices being less than the refractive index of the respective inner reflecting cladding located in close proximity, and an external protective coating.

Difference $\Delta n_{b1 \ldots m}$ in the refractive index of each element of the barrier region relative of the outer cladding refractive index $n_0$ is $\Delta n_{b1 \ldots m} = n_{b1 \ldots m} - n_0$ and has a negative value.

According to the second aspect of the invention, interspaces of fused silica or doped fused silica are formed between elements of the barrier region, the inner reflecting claddings and the outer cladding.

The elements of the barrier region have an arbitrary cross-sectional shape, which may represent one of circle, square, rhombus, rectangle, square with rounded corners, rhombus with rounded corners and rectangle with rounded corners.

According to the second aspect of the invention, in case of the inner reflecting claddings made of fused silica, refractive indices $n_{cl1}$, $n_{cl2}$, $n_{clk}$ of the inner reflecting claddings are equal to $n_0$, and in case of the inner reflecting claddings made of doped fused silica refractive indices $n_{cl1}$, $n_{cl2}$, $n_{clk}$ of each of said claddings is greater than, equal to or less than the fused silica refractive index $n_0$.

Furthermore, the inner reflecting claddings have a cross-sectional shape selected from circle, hexagon, square, square with rounded corners, and hexagon with rounded corners.

According to the second aspect of the invention, difference $\Delta n_{cl1 \ldots k}$ in the refractive index of each of said inner reflecting claddings relative to the outer cladding refractive index $n_0$ is $\Delta n_{cl1 \ldots k} = n_{cl1 \ldots k} - n_0$, and difference $\Delta n_{c1 \ldots k}$ in the refractive index of each of said light-guiding cores relative to the outer cladding refractive index $n_0$ of the multicore fiber is $\Delta n_{c1 \ldots k} = n_{c1 \ldots k} - n_0$. Difference $\Delta n_{c1 \ldots k}$ in the refractive index of each light-guiding core relative to the outer cladding refractive index is in the range from 0.002 to about 0.015. Difference $\Delta n_{cl1 \ldots k}$ in the refractive index of each inner reflecting cladding relative to the outer cladding refractive index is from −0.001 to about 0.002, and difference $\Delta n_{b1 \ldots m}$, in the refractive index of each element of the barrier region relative to the outer cladding refractive index $n_0$ is less than −0.002 if the elements of the barrier region are made of doped fused silica.

According to the second aspect of the invention, the elements of the barrier region are made of doped fused silica containing at least one dopant selected from the group consisting of boron oxide, fluorine, or a combination thereof.

According to the invention, the distance from the center of each light-guiding core to the adjacent element of the barrier region is from 8 to 35 microns.

According to a third aspect of the invention there is provided a multicore optical fiber comprising at least two light-guiding cores made of doped fused silica with refractive indices $n_{c1}$, $n_{c2}$, $n_{ck}$, each of the light-guiding cores of the at least two light-guiding cores being surrounded by a respective reflecting arbitrarily shaped inner cladding made of fused silica or doped fused silica with refractive indices $n_{cl1}$, $n_{cl2}$, $n_{clk}$, which are less than the refractive indices $n_{c1}$, $n_{c2}$, $n_{ck}$ of respective light-guiding cores; an intermittent barrier region formed in the space in fused silica or doped fused silica between the inner reflecting claddings and an outer cladding made of fused silica with a refractive index $n_0$, and consisting of arbitrarily arranged individual elements representing through holes filled with gas, which is air or gas with similar properties, and having a refractive index which is less than the refractive index of the respective inner reflecting cladding located in close proximity, and an external protective coating.

According to the invention, the inner reflecting claddings are made of fused silica or doped fused silica, and in case of the inner reflecting claddings made of fused silica the refractive indices $n_{cl1}$, $n_{cl2}$, $n_{clk}$ of said inner reflecting claddings are equal to $n_0$, and in case of the inner reflecting claddings made of doped fused silica the refractive index $n_{cl1}$, $n_{cl2}$, $n_{clk}$ of each of said inner reflecting claddings is greater than, equal to or less than the fused silica refractive index $n_0$.

According to the invention, said inner reflecting claddings have a cross-sectional shape selected from circle, hexagon, square, square with rounded corners and hexagon with rounded corners.

Difference $\Delta n_{cl1 \ldots k}$ in the refractive index of each of said inner reflecting claddings relative to the outer cladding refractive index $n_0$ is $\Delta n_{cl1 \ldots k} = n_{cl1 \ldots k} - n_0$, and difference $\Delta n_{c1 \ldots k}$ in the refractive index of each light-guiding core relative to the outer cladding refractive index $n_0$ of the multicore fiber is $\Delta n_{c1 \ldots k} = n_{c1 \ldots k} - n_0$; difference $\Delta n_{c1 \ldots k}$ in the refractive index of each light-guiding core relative to the refractive index of the outer cladding is in the range from 0.002 to 0.015. In addition, difference $\Delta n_{cl1 \ldots k}$ in the refractive index of each inner reflecting cladding relative to outer cladding refractive index is from about −0.001 to about 0.002.

Furthermore, according to the third aspect of the invention, difference $\Delta n_b$ in the refractive index of the barrier region comprising through holes relative to the outer cladding refractive index is $\Delta n_b = n_b - n_0$ and has a negative value.

According to the third aspect of the invention, the space in which through holes are formed is made of doped fused silica containing at least one dopant selected from the group consisting of boron oxide, fluorine, or a combination thereof, and the distance from the center of each light-guiding core to the adjacent barrier region area comprising through holes is from 8 to 35 microns.

According to all aspects of the invention, in the multicore fiber the inner reflecting claddings are made of doped fused silica containing at least one dopant selected from the group consisting of germanium oxide, aluminum oxide, phosphorus oxide, chlorine, boron oxide, fluorine, or a combination thereof, and the light-guiding cores are made of doped fused silica containing at least one dopant selected from the group consisting of germanium oxide, aluminum oxide, phosphorus oxide, chlorine, boron oxide, fluorine, sodium, or a combination thereof.

The light-guiding cores can be arranged in the fiber in hexagonal array, tetragonal array or in a similar array.

Furthermore, according to the invention the light-guiding cores have diameters $D_{c1}$, $D_{c2}$, $D_{ck}$, which are in the range from about 4 to about 50 microns, and the diameters $D_{c1}$, $D_{c2}$, $D_{ck}$ of said light-guiding cores are the same or different. The refractive indices $n_{c1}$, $n_{c2}$, $n_{ck}$ of the light-guiding cores are the same or different.

Values of diameters of the light-guiding cores and values of refractive indices thereof must be in a predetermined range, so that the produced fibers met standards of International Telecommunications Unit ITU-T G 651-657.

BRIEF DESCRIPTION OF THE DRAWINGS

The invention will be further illustrated by the description of preferred embodiments thereof with reference to the accompanying drawings, wherein:

FIG. 1b shows the refractive index profile along A-B axis of the multicore fiber according to FIG. 1a.

FIG. 4a is a schematic view of a preform of one core and an inner reflecting cladding;

FIG. 4b is a schematic view of an element of a pre-assembled preform (7), which is a preform for formation of a barrier region (3) or ($3_1 \ldots 3_m$);

FIG. 4c is a schematic view of a pre-assembled preform, i.e. a preform of one core and an inner reflecting cladding, surrounded by barrier region preforms;

FIG. 4d is a schematic view of the pre-assembled preform placed in a silica glass tube;

FIG. 4e is a schematic view of fused preform of one core, inner reflecting cladding and barrier region obtained after melting of the pre-assembled preform in the silica glass tube.

FIG. 5a is a schematic view of an assembled preform of fused preforms of one core, inner reflecting cladding and barrier region, placed in a silica glass tube;

FIG. 5b is a schematic view of an assembled preform of fused preforms of one core, inner reflecting cladding and barrier region, placed in a silica glass tube with additional rods to fix the assembled preform;

FIG. 5c is a schematic view of a derived preform of a multicore fiber, i.e. a preform obtained after melting the assembled preform in the tube.

DESCRIPTION OF PREFERRED EMBODIMENTS

Figure 1A:
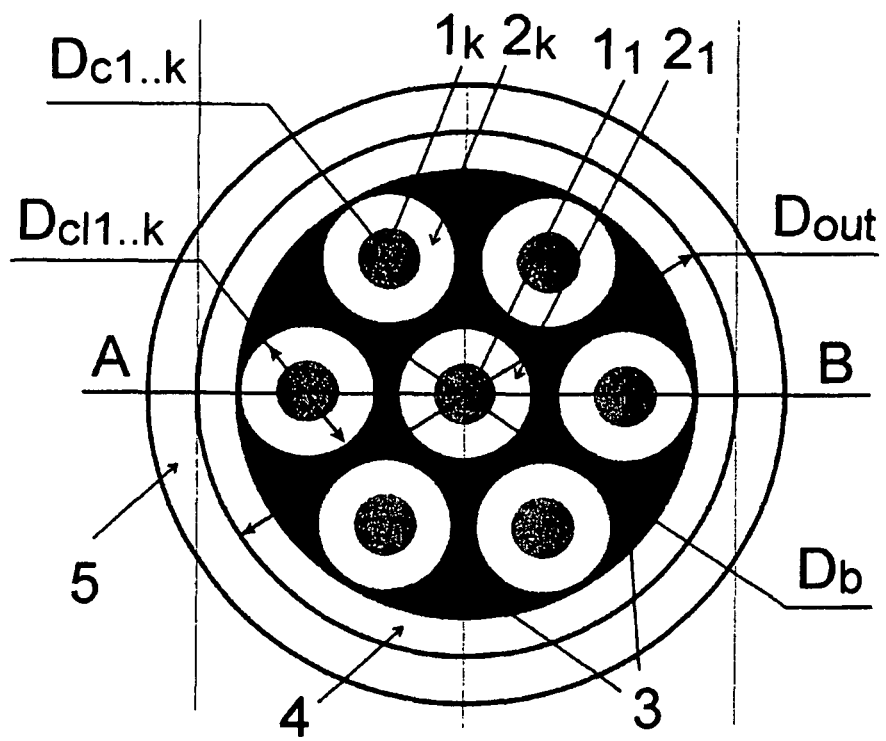
FIG. 1a is a cross-sectional view of a multicore fiber according to an embodiment of the invention.

A multicore fiber will be described with reference to FIGS. 1a-b and 2.

FIG. 1 shows a multicore optical fiber comprising at least two light-guiding cores ($1_1 \ldots 1_k$), each of the cores being surrounded by a respective inner reflecting cladding ($2_1 \ldots 2_k$), a barrier region (3), which is defined by the space between the inner reflecting claddings ($2_1 \ldots 2_k$) and an outer cladding (4), as well as an external protective coating (5) of the multicore fiber. The external protective coating (5) is used to prevent mechanical damage to the fiber in operation.

Figure 1B:
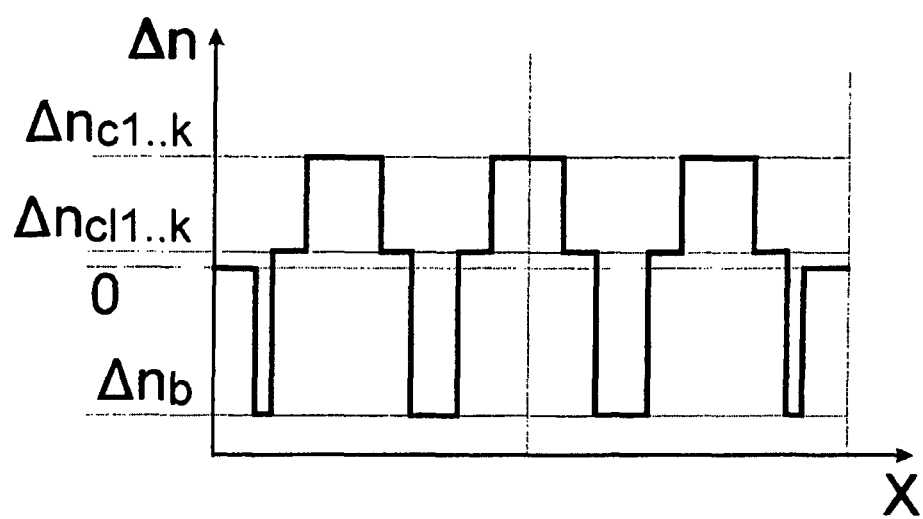
Figure 2A:
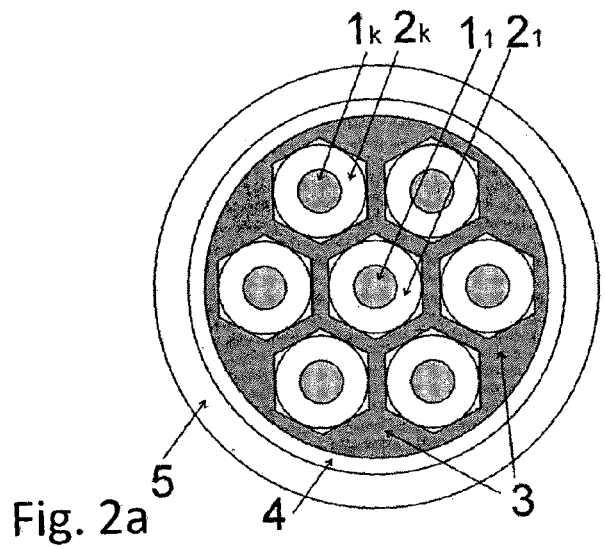
FIG. 2a is a cross sectional view of a multicore fiber with a continuous barrier region.
Figure 2B:
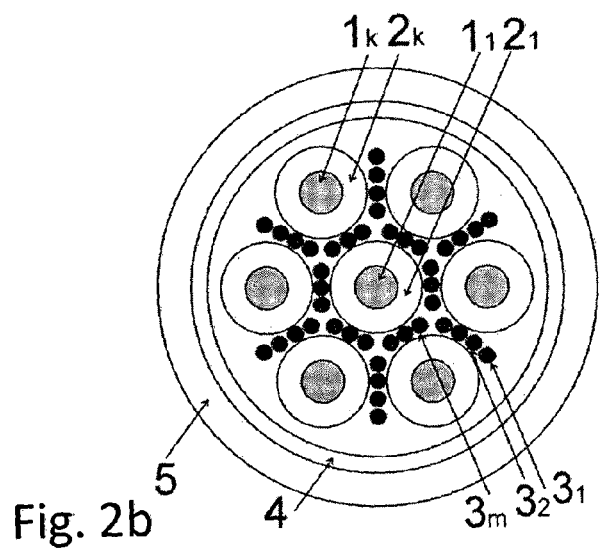
FIG. 2b is a cross-sectional view of a multicore fiber with a barrier region consisting of individual elements.
Figure 2C:
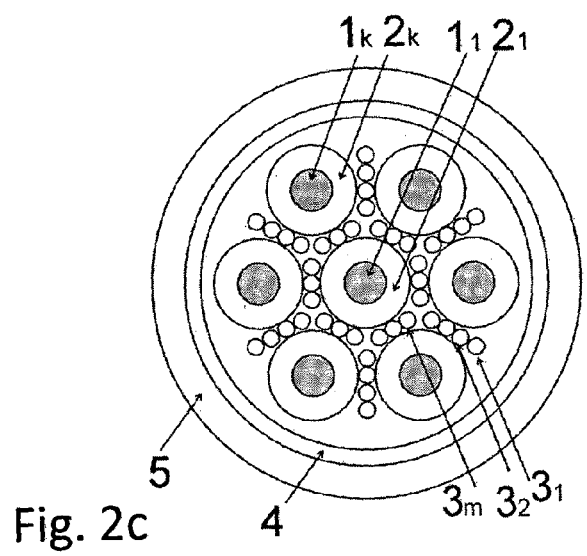
FIG. 2c is a cross-sectional view of a multicore fiber with a barrier region consisting of individual elements such as through holes.

FIG. 1b shows an exemplary refractive index profile of a multicore fiber according to the invention, where $\Delta n_{c1 \ldots k}$ is the difference in the refractive index of each of the light-guiding cores ($1_1 \ldots 1_k$) relative to refractive index $n_0$ of the outer cladding (4);

$\Delta n_{cl1 \ldots k}$ is the difference in the refractive index of each of said inner reflecting claddings ($2_1 \ldots 2_k$) relative to refractive index $n_0$ of the outer cladding (4);

$\Delta n_b$ is the difference in the refractive index of the barrier region relative to refractive index $n_0$ of the outer cladding (4), where "0" value on $\Delta n$ axis corresponds to the refractive index of the outer cladding.

Further, consider structural features of a multicore fiber according to the invention in more detail. Light-guiding cores ($1_1 \ldots 1_k$) (there can be two or more cores in the optical fiber) have diameters $D_{c1}$ $D_{c2}$, $D_{ck}$ and are made of doped fused silica with refractive indices $n_{c1}$, $n_{c2}$ $n_{ck}$, which are higher than the fused silica refractive index $n_0$.

It should be noted that both the diameters $D_{c1}$, $D_{c2}$, $D_{ck}$ of the light-guiding cores ($1_1 \ldots 1_k$) and their refractive indices $n_{c1}$, $n_{c2}$, $n_{ck}$ are equal or slightly different. With that, values of diameters of the light-guiding cores ($1_1 \ldots 1_k$), as well as values of refractive indices of the cores, must be in the range providing the compliance of the produced fibers with International Telecommunications Unit standards ITU-T G 651-657, for example, diameters of light-guiding cores (1) can be equal to 8.1 microns and 9.4 microns, and difference $\Delta n$ in the refractive indices of the light-guiding core and the inner reflecting cladding can be 0.0055. Similar values of core diameters used in a multicore optical fiber are disclosed in the publication by T. Hayashi, T. Nagashima, A. Shimakawa, T. Sasaki, E. Sasaoka "Crosstalk variation of multicore fiber due to fiber bend" ECOC 2010, We8.F.6 19-23 September, Torino, Italy, 2010.

Difference $\Delta n_{c1 \ldots k}$ in the refractive index of each of the light-guiding cores ($1_1 \ldots 1_k$) relative to the outer cladding (4) refractive index $n_0$ of the multicore fiber is $\Delta n_{c1 \ldots k} = n_{ck} - n_0$. Cores can be arranged in the optical fiber in hexagonal array, tetragonal array or in other arrays.

As already mentioned, each of the light-guiding cores ($1_1 \ldots 1_k$) is surrounded by respective inner reflecting cladding ($2_1 \ldots 2_k$), which is made of fused silica or doped fused silica. In case of inner reflecting claddings ($2_1 \ldots 2_k$) made of fused silica, refractive indices $n_{cl1}$, $n_{cl2}$, $n_{clk}$ of inner reflecting claddings ($2_1 \ldots 2_k$) will be equal to $n_0$, and in case of inner reflecting claddings ($2_1 \ldots 2_k$) made of doped fused silica refractive index $n_{cl1}$, $n_{cl2}$, $n_{clk}$ of each the inner reflecting claddings ($2_1 \ldots 2_k$) may be greater than, equal to or less than the fused silica refractive index $n_0$, but in both cases the refractive index $n_{cl1}$, $n_{cl2}$, $n_{clk}$ of each inner reflecting cladding ($2_1 \ldots 2_k$) must be less than the refractive index of respective light-guiding core ($1_1 \ldots 1_k$).

Inner reflecting claddings ($2_1 \ldots 2_k$) can have a cross-section in the shape of a circle (see FIG. 1a) with diameters $D_{cl1}$, $D_{cl2}$, $D_{clk}$, an ordinary hexagon (FIG. 2a) or a hexagon with rounded corners, an ordinary square or a square with rounded corners describing a circle of diameter $D_{cl1}$, $D_{cl2}$, $D_{clk}$, and difference $\Delta n_{cl1\ldots k}$ in the refractive index of each of the inner reflecting cladding ($2_1 \ldots 2_k$) relative to the refractive index $n_0$ of the outer cladding (4) of the multicore fiber is $\Delta n_{cl1\ldots k} = n_{cl1\ldots k} - n_0$.

Some features of cross-sectional shape of claddings ($2_1 \ldots 2_k$) (such as the rounded corners) are formed in the manufacturing process.

As mentioned above, barrier region (3) is defined by the space formed between inner reflecting claddings ($2_1 \ldots 2_k$) and the outer cladding (4) of the fiber. The barrier region (3) has refractive index $n_b$, which is less than the refractive index of each of the inner reflecting claddings. In addition, refractive index $n_b$ of the barrier region must be less than refractive index $n_0$ of the outer cladding (4) made of fused silica.

According to an embodiment of the invention, the barrier region (3) can be continuous (FIG. 2a) and consist of doped fused silica with refractive index $n_b$, which is less than the refractive index of each of the inner reflecting claddings and less than the refractive index of the outer cladding (4); in this case difference $\Delta n_b$ in the refractive index of the barrier region relative to the outer cladding refractive index is $\Delta n_b = n_b - n_0$. Barrier region (3) can have an arbitrary cross sectional shape (cells (honeycomb), interconnected rings).

According to another embodiment of the invention, the barrier region 3 can be discontinuous and composed of individual barrier elements ($3_1 \ldots 3_m$) arranged arbitrarily (FIG. 2b) and made of doped fused silica with refractive index $n_{b1}$, $n_{b2}$, $n_{bm}$, which is less than the refractive index of respective inner reflecting cladding and less than the refractive index of the outer cladding (4). The difference in the refractive index of each barrier element ($3_1 \ldots 3_m$) of the barrier region relative to refractive index $n_0$ of the outer cladding (4) is $\Delta n_{b1\ldots m} = n_{b1\ldots m} - n_0$.

Interspaces formed between elements ($3_1 \ldots 3_m$) of the barrier region, inner reflecting claddings ($2_1 \ldots 2_k$) and outer cladding (4) are made of fused silica or doped fused silica. Elements of the barrier region can have an arbitrary cross sectional shape, such as circle, square, rhombus, etc.

According to another embodiment of the invention, the barrier region 3 can be intermittent and consist of individual elements ($3_1 \ldots 3_m$) in the form of through holes located a predetermined manner (FIG. 2b) in fused silica or doped fused silica. Thus, the interspaces formed between elements ($3_1 \ldots 3_m$) of the barrier region, i.e. through holes, inner reflecting claddings ($2_1 \ldots 2_k$) and outer cladding (4) are made of fused silica or doped fused silica.

The outer cladding (4) has inside diameter $D_{in}$ 120-125 microns and outside diameter $D_{out}$ 125 microns and refractive index equal to the fused silica refractive index $n_0$. Thus, the outer cladding can have even zero thickness, i.e. $D_{in}$ can be equal to $D_{out}$. The outer cladding (4) is needed to bring the diameter of the fiber to the value specified by standards (ITU-T G-651-657) and provide the required mechanical properties.

The light-guiding cores ($1_1 \ldots 1_k$) of the fiber are made of fused silica containing at least one dopant selected from the group consisting of germanium oxide, aluminum oxide, phosphorus oxide, chlorine, boron oxide, fluorine, sodium, or a combination thereof.

Inner reflecting claddings ($2_1 \ldots 2_k$) are made of pure fused silica or doped fused silica containing at least one dopant selected from the group consisting of germanium oxide, aluminum oxide, phosphorus oxide, chlorine, boron oxide, fluorine or a combination thereof. Continuous barrier region (3) according to an embodiment of the invention or an intermittent barrier region composed of barrier elements ($3_1 \ldots 3_m$) according to another embodiment of the invention are made of doped fused silica containing at least one dopant selected from the group consisting of boron oxide, fluorine, or a combination thereof. Doping with these dopants provides a refractive index less than that of fused silica. According to another embodiment of the invention, the barrier region is made in the form of through holes filled with air or another gas (barrier elements ($3_1 \ldots 3_m$), which are formed in fused silica or doped fused silica. The outer cladding (4) is composed of silicon oxide. The external protective coating (5) consists of a material selected from the group of polymer, carbon, lacquer, metal or it is a multilayered coating comprising different layers of the above components.

The light-guiding cores ($1_1 \ldots 1_k$) are designed to provide radiation on the multicore optical fiber according to the invention. In fiber-optic communications lines the light-guiding core transmits data signal.

According to the invention, refractive indices of the light-guiding cores of a multicore fiber ($1_1 \ldots 1_k$) are greater than the refractive indices of the surrounding inner reflecting claddings ($2_1 \ldots 2_k$), so that radiation can be localized in the fiber cores by total inner reflection. Distribution of the mode field over the cross section of the fiber is such that part of the radiation propagates beyond the core at a distance reaching a few radii of the core. In multicore fibers, the mode fields of neighboring cores may partly overlap and give rise to optical crosstalk leading to data signal distortion and increasing the number of errors during transmission. The crosstalk arises from the fact that the mode field of one light-guiding core interacts with the mode field of the other light-guiding core, which results in pumping power from one mode to the other. The pumped power portion depends on the degree of overlapping the two mode fields, i.e. on the integral of the product of the electric field strength of the two modes over the fiber cross-sectional area (A. Snyder, J. Love, "Theory of optical waveguides," Moscow "Radio Communication" 1987).

It is apparent that the present structure of a multicore fiber with a continuous or intermittent barrier region (3) or ($3_1 \ldots 3_m$) with a refractive index less than the refractive index of the inner reflecting claddings ($2_1 \ldots 2_k$), located between the interacting light-guiding cores ($1_1 \ldots 1_k$), significantly reduces the mode field overlap integral and, consequently, reduces optical cross-talk. Also, the presence of the barrier region (3 or $3_1 \ldots 3_m$) according to embodiments of the invention prevents the radiation outflow from the light-guiding cores ($1_1 \ldots 1_k$) of the optical fiber into the external protective coating (5) of the fiber, thereby reducing the bend optical loss. Reducing crosstalk and reducing bend losses will reduce errors and improve the information transfer quality.

In addition, the presence of inner reflecting claddings ($2_1 \ldots 2_k$) around the light-guiding cores ($1_1 \ldots 1_k$) provides a gap between the core and the barrier region (3) or ($3_1 \ldots 3_m$), needed to ensure that the barrier layer does not affect the optical properties of the core mode, such as mode field diameter, group velocity dispersion, cutoff wavelength. This is necessary to meet standards (ITU-T G-651-657) and to ensure compatibility with other optical fibers utilized in fiber-optic communications lines.

To ensure the optical characteristics meeting standards for telecommunications fibers ITU-T G651-657, parameters of the light-guiding cores of the fiber are to be in the following ranges:

diameters $D_{c1}$, $D_{c2}$, $D_{ck}$ of light-guiding cores ($1_1 \ldots 1_k$) from 4 to 50 microns;

difference $\Delta n_{ck}$ in the refractive index of each light-guiding core ($1_1 \ldots 1_k$) of the fiber relative to the refractive index of the outer cladding (4) $\Delta n_{c1 \ldots k} = n_{c1 \ldots k} - n_0$ from 0.002 to 0.015;

distance from the center of the light-guiding core ($1_1 \ldots 1_k$) to the adjacent barrier region from 8 to 35 microns. This distance should be minimal with the proviso that the barrier region does not affect the mode properties of the light-guiding core ($1_1 \ldots 1_k$) so that the fiber fails to meet respective standards (ITU T G-651-657).

Based on the analysis of various aspects, the authors have concluded that for optimal operation of the present invention, it is necessary that:

1) Difference $\Delta n_{cl1 \ldots k}$ between the refractive index of each inner reflecting cladding ($2_1 \ldots 2_k$) and that of the outer cladding (4) is $\Delta n_{cl1 \ldots k} = n_{cl1 \ldots k} - n_0$ and ranges from –0.001 to 0.002;

2) Difference $\Delta n_b$ between the refractive index of barrier region (3) and that of the outer cladding (4) is $\Delta n_b = n_b - n_0$ and is less than or equal to –0.002 in case where elements of the barrier region are made of doped fused silica.

The above ranges of difference $\Delta n_b$ between the refractive indices of the barrier region and the outer cladding are chosen, on the one hand, to ensure a significant reduction in the interaction between the modes, and on the other hand, to provide the fabrication feasibility of this structure.

Figure 3:
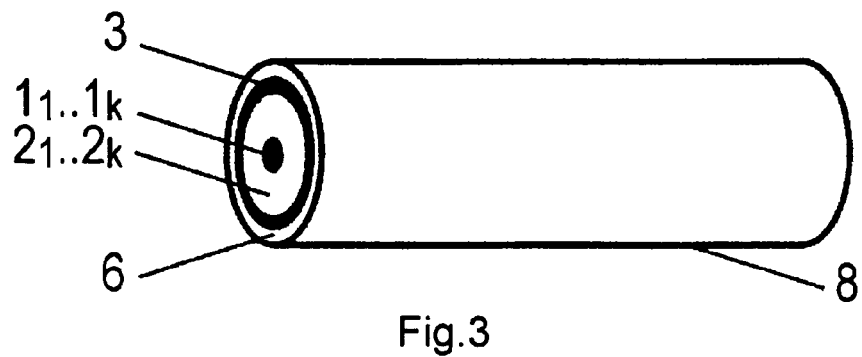
FIG. 3 is a schematic view of a preform of one core with an inner reflecting cladding and a barrier region for a multicore fiber according to the invention, fabricated by vapor deposition inside a silica glass tube.

A method of manufacturing a multicore optical fiber according to the invention, which exhibits a reduced cross-talk and reduced bend loss, will be further described and illustrated with reference to FIGS. 3-5 as implemented in the following manner.

Preforms of light-guiding cores ($1_1 \ldots 1_k$), inner reflecting claddings ($2_1 \ldots 2_k$) of the fiber and barrier region (3) are prepared.

In an embodiment of the invention (FIG. 3) preforms of barrier region (3), inner reflecting claddings ($2_1 \ldots 2_k$) and light-guiding cores ($1_1 \ldots 1_k$) are formed by vapor deposition of doped fused silica, i.e. by MCVD (modified chemical vapor deposition) or PCVD (plasma-chemical vapor deposition) in a specified order within a silica glass tube (6). After completion of the process, the tube (6), in which deposition takes place, can be removed using hydrofluoric acid or mechanical treatment.

Figure 4A:
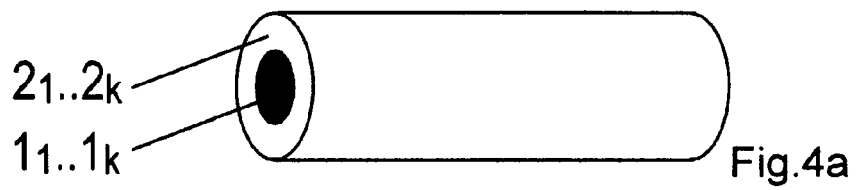
FIG. 4a-e is a schematic view of a preform of one core with an inner reflecting cladding and a barrier region for a multicore fiber according to the invention fabricated by assembling and melting, at different fabrication stages.
Figure 4B:
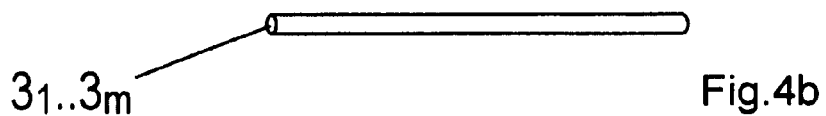
Figure 4C:
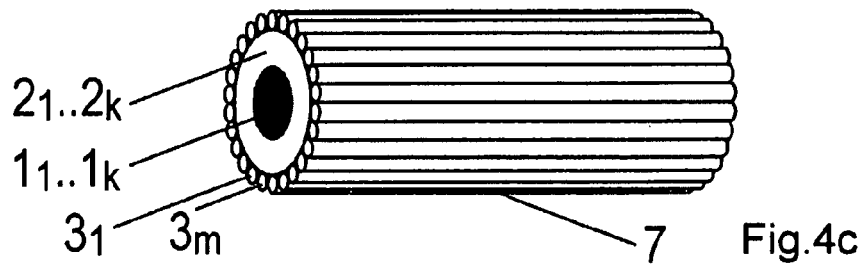

In another embodiment (FIG. 4a-e) for forming a preform of light-guiding cores ($1_1 \ldots 1_k$), inner reflecting claddings ($2_1 \ldots 2_k$) of the fiber and barrier region (3) consisting of elements of the barrier region (denoted in FIG. 4b as $3_1 \ldots 3_m$), first a preform is assembled of the above constituents, hereinafter referred to as pre-assembled preform (7) (FIG. 4c). First, elements of the pre-assembled preform (7) are separately manufactured. The central element of the pre-assembled preform (7) is a preform of only an inner reflecting cladding ($2_1 \ldots 2_k$) and a light-guiding core ($1_1 \ldots 1_k$) (FIG. 4a), which is produced by vapor deposition in MCVD, PCVD, VAD (vapor phase axial deposition) or OVD (outside vapor deposition) processes.

Elements ($3_1 \ldots 3_m$) (FIG. 4b) of the pre-assembled preform (7), which are preforms for formation of the barrier region (3) or ($3_1 \ldots 3_m$), are manufactured by vapor deposition or another method.

Figure 4D:
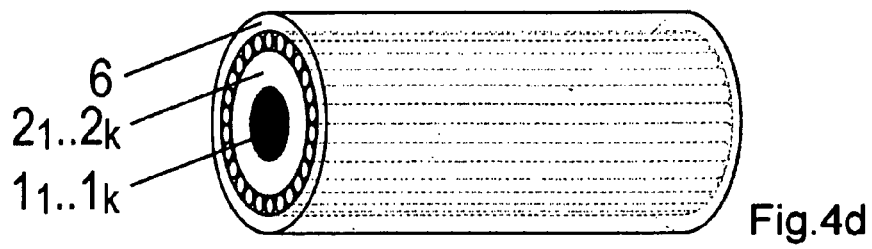
Figure 4E:
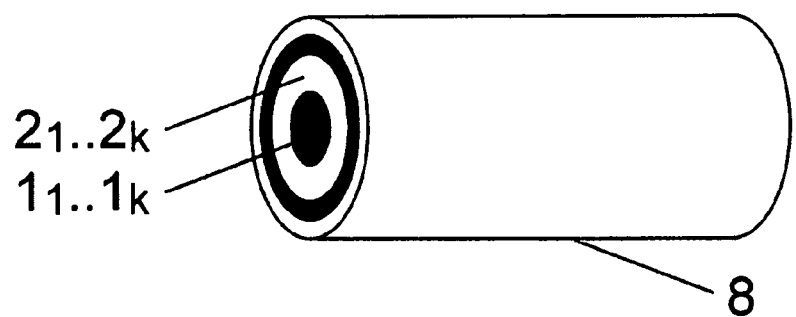

Elements ($3_1 \ldots 3_m$) are rods of fused silica containing dopants selected from the group consisting of boron oxide, fluorine, germanium oxide, and a combination thereof. The rods can have an arbitrary cross-sectional shape. Elements ($3_1 \ldots 3_m$) for the assembled preform (7) can be silica glass tubes. Next, the pre-assembled preform (7) is fabricated and positioned. Elements ($3_1 \ldots 3_m$) are placed around the preform for a light-guiding core ($1_1 \ldots 1_k$) and an inner reflecting cladding ($2_1 \ldots 2_k$) (FIG. 4c). Elements ($3_1 \ldots 3_m$) can be identical or different in composition, shape and optical properties. Then, the pre-assembled preform (7) composed of the above constituent elements is placed inside a silica glass tube (6) (FIG. 4d). Tube (6) is firmly put on the pre-assembled preform (7) and holds its constituent elements relative to each other. One end of the tube (6) is sealed by means of, for example, a gas burner. The other end is connected to a vacuum pump, which creates reduced pressure within the tube. Then the pre-assembled preform (7) in the tube (6) is fed into a furnace and heated to the silica glass softening temperature, 1800-2300° C. Because of the pressure difference inside and outside of the tube (6), spaces between the constituent elements of the pre-assembled preform (7) and spaces between the elements of pre-assembled preform (7) and tube (6) collapse when heated, and the preform turns into a solid rod, so after melting the pre-assembled preform (7) in the tube (6) forms a fused preform (8) (FIG. 4e).

An exception is the case where elements ($3_1 \ldots 3_m$) of the barrier region of the fiber are through holes, filled e.g. with air or gas with similar properties. In this case, the elements ($3_1 \ldots 3_m$) for pre-assembled preform are hollow capillaries of silica glass, sealed on both sides, with air remaining inside the capillaries and creating pressure. When the pre-assembled preform is melted and collapses, pressure inside the barrier region hollow elements ($3_1 \ldots 3_m$) prevents them from collapsing, so air holes remain in the cross-section of the fused preform (8).

Further, the fused pre-assembled preform (8) (FIG. 4d) can be pulled to a smaller diameter for further manipulation. After completion of the process, the tube (6) can be removed with the aid of hydrofluoric acid or mechanically.

Figure 5A:
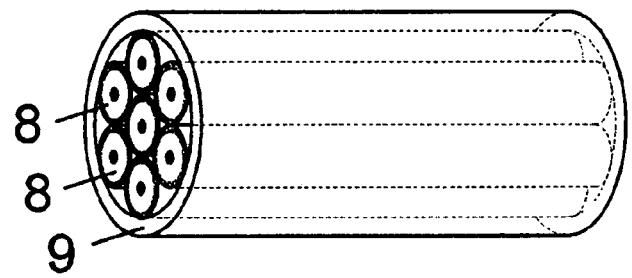
FIG. 5a-c is a schematic view of a preform of a multicore fiber at different fabrication stages.
Figure 5B:
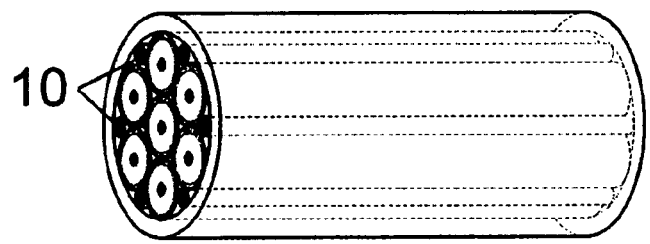
Figure 5C:
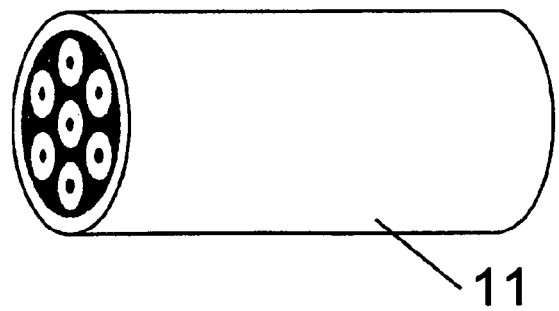

Next, a process of manufacturing a preform of a multicore fiber according to the invention will be described with reference to FIG. 5a-5c. Fused preforms (8) consisting of preforms of light-guiding cores ($1_1 \ldots 1_k$), inner reflecting claddings ($2_1 \ldots 2_k$) and barrier region (3) or ($3_1 \ldots 3_m$) are placed inside a silica glass tube (9) (FIG. 5a). Diameters of the preforms and tubes (9) are chosen so that the positions of all elements were fixed. For example, seven fused preforms (8) for light-guiding core, inner cladding and barrier region, having a circular cross section with a predetermined diameter, can be inserted in a tube (9) with an inside diameter, which is three times the outside diameter of the preform of the core, inner cladding and barrier region.

In addition, the preforms can be inserted in a tube with a square or another cross-sectional shape. If the fused preforms (8) contain through holes, they must be hermetically closed by means of, for example, sealing the ends of the preform. To additionally fix the elements inside the tube, rods (10) of fused silica with an arbitrary cross-sectional shape can be used (FIG. 5b). Further, one end of the tube (9) with preforms (8) is sealed using, for example, a gas burner. The other end is connected to a vacuum pump, which creates reduced pressure within the tube. Then the assembled preform in the supporting tube is fed into the furnace and heated to the fused silica softening temperature, 1800-2300° C. Because of the pressure difference inside and outside the supporting tube (9), the inside holes collapse when heated and the preform turns into a solid rod. The result is a derived preform (11) (FIG. 5c).

The fiber can be drawn either from the derived preform (11) or simultaneously with the collapsing process of the assembled preform.

The process of manufacturing a multicore fiber presented herein is not limited to the disclosed embodiments and can be modified by any known methods and their modifications known to those skilled in the art.

INDUSTRIAL APPLICABILITY

Present embodiments of a multicore fiber with a barrier region can be utilized in optical communications systems as a transmitting optical fiber to deliver signal in intracity communications lines, when the number or the general section of the laid fiber-optic cables is restricted.

The invention claimed is:

1. A multicore optical fiber comprising:
   at least two light-guiding cores made of doped fused silica with refractive indices $n_{c1}$, $n_{c2}$, $n_{ck}$;
   each light-guiding core of the at least two light-guiding cores being surrounded by a respective arbitrarily shaped inner reflecting cladding made of fused silica or doped fused silica with refractive indices $n_{c11}$, $n_{c12}$, $n_{clk}$, which are less than the refractive indices $n_{c1}$, $n_{c2}$, $n_{ck}$ of respective light guiding cores;
   a continuous barrier region made of doped fused silica and having an arbitrary cross-sectional shape, the barrier region being formed in the space between the inner reflecting claddings and an outer cladding made of fused silica with refractive index $n_0$, the barrier region having refractive index $n_b$, which is less than the refractive index of each of the inner reflecting claddings, and
   an external protective coating.

2. A fiber according to claim 1, wherein said inner reflecting claddings are made of fused silica or doped fused silica.

3. A fiber according to claim 2, wherein in case of the inner reflecting claddings made of fused silica, refractive indices $n_{c11}$, $n_{c12}$, $n_{clk}$ of said inner reflecting claddings are equal to $n_0$.

4. A fiber according to claim 2, wherein in case of the inner reflecting claddings made of doped fused silica, refractive index $n_{c11}$, $n_{c12}$, $n_{clk}$ of each of said inner reflecting claddings is greater than, equal to, or less than the fused silica refractive index $n_0$.

5. A fiber according to claim 1, wherein said inner reflecting claddings have cross-sectional shape selected from circle, hexagon, square, square with rounded corners, and hexagon with rounded corners.

6. A fiber according to claim 1, wherein difference $\Delta n_{c11\ldots k}$ in the refractive index of each of said inner reflecting claddings relative to the outer cladding refractive index $n_0$ is $\Delta n_{c11\ldots k} = n_{c11\ldots k} - n_0$.

7. A fiber according to claim 2, wherein said inner reflecting claddings are made of doped fused silica containing at least one dopant selected from the group consisting of germanium oxide, aluminum oxide, phosphorus oxide, chlorine, boron oxide, fluorine, or a combination thereof.

8. A fiber according to claim 1, wherein said barrier region is made of doped fused silica containing at least one dopant selected from the group consisting of boron oxide, fluorine, or a combination thereof.

9. A fiber according to claim 1, wherein said at least two light-guiding cores are made of doped fused silica containing at least one dopant selected from the group consisting of germanium oxide, aluminum oxide, phosphorus oxide, chlorine, boron oxide, fluorine, sodium or a combination thereof.

10. A fiber according to claim 1, wherein difference $\Delta n_{c1\ldots k}$ in the refractive index of each light-guiding core relative to the outer cladding refractive index $n_0$ of the multicore fiber is $\Delta n_{c1\ldots k} = n_{c1\ldots k} - n_0$.

11. A fiber according to claim 1, wherein said light-guiding cores are arranged in the fiber in hexagonal array, tetragonal array or in a similar array.

12. A fiber according to claim 1, wherein said light-guiding cores have diameters $D_{c1}$, $D_{c2}$, $D_{ck}$, which are in the range from 4 to 50 microns.

13. A fiber according to claim 10, wherein difference $\Delta n_{c1\ldots k}$ in the refractive index of each light-guiding core relative to the outer cladding refractive index in the range from 0.002 to 0.015.

14. A fiber according to claim 1, wherein the distance from the center of each light-guiding core to the adjacent barrier region is from 8 to 35 microns.

15. A fiber according to claim 12, wherein the refractive indices $D_{c1}$, $D_{c2}$, $D_{ck}$ of said light-guiding cores are the same or different.

16. A fiber according to claim 1, wherein the refractive indices $n_{c1}$, $n_{c1}$, $n_{ck}$ of the light-guiding cores are the same or different.

17. A fiber according to claim 15, wherein the values of the diameters of the light-guiding cores and values of the refractive indices thereof are in a predetermined range, so that the produced fibers met standards of International Telecommunications Unit ITU-T G 651-657.

18. A fiber according to claim 1, wherein difference $\Delta n_{c11\ldots k}$ in the refractive index of each inner reflecting cladding relative to the outer cladding refractive index is from −0.001 to 0.002.

19. A fiber according to claim 1, wherein difference $\Delta n_b$ in the refractive index of the barrier region relative to the outer cladding refractive index is $\Delta n_b = n_b - n_0$ and has a negative value.

20. A fiber according to claim 19, wherein difference $\Delta n_b$ in the refractive index of the barrier region relative to the outer cladding refractive index is less than or equal to −0.002 if the barrier region is made of doped fused silica.

21. A multicore optical fiber comprising:
   at least two light-guiding cores made of doped fused silica with the refractive indices $n_{c1}$, $n_{c2}$, $n_{ck}$; each light-guiding core of said at least two light-guiding cores being surrounded by a respective arbitrarily shaped inner reflecting cladding of fused silica or doped fused silica with refractive indices $n_{c11}$, $n_{c12}$, $n_{clk}$, which are less than the refractive indices $n_{c1}$, $n_{c2}$, $n_{ck}$ of respective light guiding cores;
   an intermittent barrier region formed in the space between the inner reflecting claddings and an outer cladding of fused silica with refractive index $n_0$, the barrier region consisting of arbitrary arranged individual elements made of doped fused silica with refractive indices $n_{b1}$, $n_{b2}$, $n_{bm}$, each of the refractive indices being less than the refractive index of the respective inner reflecting cladding located in close proximity, and
   an external protective coating.

22. A fiber according to claim 21, wherein difference $\Delta n_{b1\ldots m}$ in the refractive index of each element of the barrier region relative to the outer cladding refractive index $n_0$ is $\Delta n_{b1\ldots m} = n_{b1\ldots m} - n_0$ and has a negative value.

23. A fiber according to claim 21, wherein interspaces of fused silica or doped fused silica are formed between said elements of the barrier region, the inner reflecting claddings and the outer cladding.

24. A fiber according to claim 21, wherein said elements of the barrier region have an arbitrary cross-sectional shape.

25. A fiber according to claim 24, wherein said cross-sectional shape of the barrier region elements is one of the shapes: circle, square, rhombus, rectangle, square with rounded corners, rhombus with rounded corners and rectangle with rounded corners.

26. A fiber according to claim 21, wherein said inner reflecting claddings are made of fused silica or doped fused silica.

27. A fiber according to claim 21, wherein in case of said inner reflecting claddings made of fused silica, refractive indices $n_{c11}$, $n_{c12}$, $n_{clk}$ of said inner reflecting claddings are equal to $n_0$.

28. A fiber according to claim 21, wherein in case of said inner reflecting claddings made of doped fused silica, refractive indices $n_{c11}$, $n_{c12}$, $n_{clk}$ of each of said claddings is greater than, equal to or less than the fused silica refractive index $n_0$.

29. A fiber according to claim 21, wherein said inner reflecting claddings have a cross-sectional shape selected from circle, hexagon, square, square with rounded corners, and hexagon with rounded corners.

30. A fiber according to claim 21, wherein difference $\Delta n_{c11\ldots k}$ in the refractive index of each of said inner reflecting claddings relative to the outer cladding refractive index $n_0$ is $\Delta n_{c11\ldots k} = n_{c11\ldots k} - n_0$.

31. A fiber according to claim 26, wherein said inner reflecting claddings are made of doped fused silica containing at least one dopant selected from the group consisting of germanium oxide, aluminum oxide, phosphorus oxide, chlorine, boron oxide, fluorine, or a combination thereof.

32. A fiber according to claim 21, wherein said elements of the barrier region are made of doped fused silica containing at least one dopant selected from the group consisting of boron oxide, fluorine, or a combination thereof.

33. A fiber according to claim 21, wherein said at least two light-guiding cores are made of doped fused silica containing at least one dopant selected from the group consisting of germanium oxide, aluminum oxide, phosphorus oxide, chlorine, boron oxide, fluorine, sodium or a combination thereof.

34. A fiber according to claim 21, wherein difference $\Delta n_{c1\ldots k}$ in the refractive index of each light guiding core relative to the outer cladding refractive index $n_0$ of the multicore fiber is $\Delta n_{c1\ldots k} = n_{c1\ldots k} - n_0$.

35. A fiber according to claim 21, wherein said light-guiding cores are arranged in the fiber in hexagonal array, tetragonal array or in a similar array.

36. A fiber according to claim 21, wherein said light-guiding cores have diameters $D_{c1}$, $D_{c2}$, $D_{ck}$, which are in the range from about 4 microns to about 50 microns.

37. A fiber according to claim 34, wherein difference $\Delta n_{c1\ldots k}$ in the refractive index of each light-guiding fiber core relative to the outer cladding refractive index is in the range from 0.002 to 0.015.

38. A fiber according to claim 21, wherein the distance from the center of each light-guiding core to the adjacent element of the barrier region is from 8 microns to 35 microns.

39. A fiber according to claim 36, wherein diameters $D_{c1}$, $D_{c2}$, $D_{ck}$ of said light-guiding cores are the same or different.

40. A fiber according to claim 21, wherein refractive indices $n_{c1}$, $n_{c1}$, $n_{ck}$ of the light-guiding cores are the same or different.

41. A fiber according to claim 39, wherein values of the diameters of the light-guiding cores and values of the refractive indices thereof are in a predetermined range, so that the produced fibers met standards of International Telecommunications Unit ITU-T 651-657.

42. A fiber according to claim 21, wherein difference $\Delta n_{c11\ldots k}$ in the refractive index of each inner reflecting cladding relative to the outer cladding refractive index is from about −0.001 to about 0.002.

43. A fiber according to claim 21, wherein difference $\Delta n_{b1\ldots m}$ in the refractive index of each element of the barrier region relative to the outer cladding refractive index $n_0$ is less than or equal to −0.002 if the barrier region elements are made of doped fused silica.

44. A multicore optical fiber comprising:
at least two light-guiding cores made of doped fused silica with refractive indices $n_{c1}$, $n_{c2}$, $n_{ck}$, each light guiding core of the at least two light-guiding cores being surrounded by a respective arbitrarily shaped inner reflecting cladding made of fused silica or doped fused silica with refractive indices $n_{c11}$, $n_{c12}$, $n_{clk}$, which are less than the refractive indices $n_{c1}$, $n_{c2}$, $n_{ck}$ of respective light-guiding cores;
an intermittent barrier region formed in the space in fused silica or doped fused silica between the inner reflecting claddings and an outer cladding made of fused silica with refractive index $n_0$, the barrier region consisting of arbitrarily arranged individual elements representing through holes filled with a gas having a refractive index that is less than the refractive index of the respective inner reflecting cladding located in close proximity, and
an external protective coating.

45. A fiber according to claim 44, wherein said through hole elements of the barrier region are filled with air or gas with similar properties.

46. A fiber according to claim 44, wherein said inner reflecting claddings are made of fused silica or doped fused silica.

47. A fiber according to claim 44, wherein in case of the inner reflecting claddings made of fused silica, refractive indices $n_{c11}$, $n_{c12}$, $n_{clk}$ of said inner reflecting claddings are equal to $n_0$.

48. A fiber according to claim 44, wherein in case of the inner reflecting claddings made of doped fused silica, refractive index $n_{c11}$, $n_{c12}$, $n_{clk}$ of each of said inner reflecting claddings is greater than, equal to, or less than the fused silica refractive index $n_0$.

49. A fiber according to claim 44, wherein said inner reflecting claddings have a cross-sectional shape selected from circle, hexagon, square, square with rounded corners and hexagon with rounded corners.

50. A fiber according to claim 44, wherein difference $\Delta_{nc11\ldots k}$ in the refractive index of each of said inner reflecting claddings relative to the outer cladding refractive index $n_0$ is $\Delta_{nc11\ldots k} = n_{c11\ldots k} - n_0$.

51. A fiber according to claim 46, wherein said inner reflecting claddings are made of doped fused silica containing at least one dopant selected from the group consisting of germanium oxide, aluminum oxide, phosphorus oxide, chlorine, boron oxide, fluorine, or a combination thereof.

52. A fiber according to claim 44, wherein said space in which through holes are formed is made of doped fused silica containing at least one dopant selected from the group consisting of boron oxide, fluorine, or a combination thereof.

53. A fiber according to claim 44, wherein said at least two light-guiding cores are made of doped fused silica containing at least one dopant selected from the group consisting of germanium oxide, aluminum oxide, phosphorus oxide, chlorine, boron oxide, fluorine, sodium, or a combination thereof.

54. A fiber according to claim 44, wherein difference $\Delta n_{c1\ldots k}$ in the refractive index of each light-guiding core relative to the outer cladding refractive index $n_0$ of the multicore fiber is $\Delta n_{c1\ldots k} = n_{c1\ldots k} - n_0$.

55. A fiber according to claim 44, wherein said light-guiding cores are arranged in the fiber in hexagonal array, tetragonal array or in a similar array.

56. A fiber according to claim 45, wherein said light-guiding cores have diameters $D_{c1}$, $D_{c2}$, $D_{ck}$, which are in the range from about 4 microns to about 50 microns.

57. A fiber according to claim 44, wherein difference $\Delta n_{c1\ldots k}$ in the refractive index of each light-guiding core of the fiber relative to the outer cladding refractive index is in the range from 0.002 to 0.015.

58. A fiber according to claim 44, wherein the distance from the center of each light-guiding core to the adjacent barrier region area comprising through holes is from 8 microns to 35 microns.

59. A fiber according to claim 56, wherein diameters $D_{c1}$, $D_{c2}$, $D_{ck}$ of said light-guiding cores are the same or different.

60. A fiber according to claim 44, wherein the refractive indices $n_{c1}$, $n_{c1}$, $n_{ck}$ of the light-guiding cores are the same or different.

61. A fiber according to claim 59, wherein values of the diameters of the light-guiding cores and values of the refractive indices thereof are in a predetermined range, so that the produced fibers met standards of International Telecommunications Unit ITU-T G 651-657.

62. A fiber according to claim 44, wherein difference $\Delta n_{c1\ldots k}$ in the refractive index of each inner reflecting cladding relative to the outer cladding refractive index is from −0.001 to 0.002.

63. A fiber according to claim 44, wherein difference $\Delta n_b$ in the refractive index of the barrier region comprising through holes relative to the outer cladding refractive index $n_0$ is $\Delta n_b = n_b - n_0$ and has a negative value.

* * * * *